(12) United States Patent
Hashimoto

(10) Patent No.: US 8,887,535 B2
(45) Date of Patent: Nov. 18, 2014

(54) WASHING DEVICE

(75) Inventor: Hideo Hashimoto, Uji (JP)

(73) Assignee: Happy Co., Ltd., Kyoto (JP)

( * ) Notice: Subject to any disclaimer, the term of this patent is extended or adjusted under 35 U.S.C. 154(b) by 933 days.

(21) Appl. No.: 13/055,435

(22) PCT Filed: Jun. 24, 2009

(86) PCT No.: PCT/JP2009/061448
§ 371 (c)(1),
(2), (4) Date: Jan. 21, 2011

(87) PCT Pub. No.: WO2010/010778
PCT Pub. Date: Jan. 28, 2010

(65) Prior Publication Data
US 2011/0132415 A1 Jun. 9, 2011

(30) Foreign Application Priority Data

Jul. 22, 2008 (JP) ................. 2008-188644

(51) Int. Cl.
| | | |
|---|---|---|
| B08B 3/12 | (2006.01) | |
| D06F 37/00 | (2006.01) | |
| D06F 33/02 | (2006.01) | |
| D06F 37/26 | (2006.01) | |
| D06F 39/08 | (2006.01) | |
| D06F 37/06 | (2006.01) | |

(52) U.S. Cl.
CPC .............. *D06F 39/088* (2013.01); *D06F 33/02* (2013.01); *D06F 37/264* (2013.01); *D06F 39/087* (2013.01); *D06F 37/06* (2013.01); *Y02B 40/56* (2013.01); *D06F 39/083* (2013.01)
USPC ....................................................... 68/3 R

(58) Field of Classification Search
None
See application file for complete search history.

(56) References Cited

U.S. PATENT DOCUMENTS

2008/0229516 A1 9/2008 Hashimoto
2011/0023558 A1 2/2011 Hashimoto

FOREIGN PATENT DOCUMENTS

| EP | 0628653 A1 | 12/1994 |
|---|---|---|
| EP | 1860225 A1 | 11/2007 |
| JP | 3841822 B1 | 11/2006 |
| JP | 3863176 B1 | 12/2006 |
| JP | 2007-002554 A | 1/2007 |
| JP | 2008-134977 A | 6/2008 |
| JP | 2008-161247 A | 7/2008 |
| TW | 188556 | 8/1992 |

OTHER PUBLICATIONS

Taiwanese Office Action of the corresponding Taiwanese Application No. 098121882, dated Mar. 25, 2014.
Extended European Search Report of the corresponding European Application No. 09800293.4, dated Jul. 10, 2014.

*Primary Examiner* — Jason Ko
(74) *Attorney, Agent, or Firm* — Global IP Counselors, LLP

(57) ABSTRACT

A washing apparatus includes a drive mechanism, a washing tub being configured to contain a washing article for washing and to be rotated by the drive mechanism, a casing that covers the washing tub, a liquid supply flow path for supplying the cleaning liquid for washing, a liquid discharge flow path, an air flow path, a detection portion being configured to detect whether or not the casing is filled with the cleaning liquid based on the cleaning liquid flowing into the air flow path, and a pump being configured to send the cleaning liquid to the liquid supply flow path, wherein the cleaning liquid is supplied to the casing in a condition that the casing communicates with the outside of the casing, after the washing article is put into the washing tub, and wherein the cleaning liquid is circulated, and wherein the washing tub is rotated, when the casing is filled.

8 Claims, 7 Drawing Sheets

WASHING DEVICE

CROSS-REFERENCE TO THE RELATED APPLICATIONS

This U.S. National stage application claims priority under 35 U.S.C.§119(a) to Japanese Patent Application No. 2008-188644, filed in Japan on Jul. 22, 2008. The entire disclosure of Japanese Patent Application No. 2008-188644 is hereby incorporated herein by reference.

BACKGROUND

1. Technical Field

The present invention relates to a washing apparatus that washes washing articles. The present invention particularly relates to a washing apparatus that washes washing articles in a washing tub which is filled with a cleaning liquid including water, a petroleum solvent or an organic solvent and the like.

2. Background Art

As a conventional washing apparatus, such a washing apparatus becomes popular not only as is provided with a washing tub, wherein a rotating axis is formed in a vertical direction, but also as is provided with a washing tub, wherein the rotating axis is formed in a horizontal direction or in a direction to be inclined from the horizontal direction (to be referred as "a horizontally inclined direction" hereafter). Then, the washing apparatus being provided with a washing tub, in which the rotating axis is formed vertically, generates a rotating flow (a swirling water current) in the cleaning liquid inside the washing tub, by rotating a pulsator that is installed to the bottom of the washing tub. By a force of the rotating flow of the cleaning liquid that is generated, washing articles such as clothes and the like are rubbed each other (a principle of rubbing wash), so that the washing articles are washed. On the other hand, a washing apparatus that is provided with a washing tub, wherein the rotating axis is formed in a horizontal direction or in a horizontally inclined direction, moves a washing article to the upper side of the washing tub with baffles being protruded on the inside wall surface of the washing tub, by rotating the washing tub, and subsequently has the washing article drop by its own weight. When the washing article drops, the washing article is washed by an impact force that is caused by an impact against the inside wall surface of the washing tub (a principle of beating wash).

A cleaning liquid that is used for washing by aforementioned washing apparatus is categorized into water or a water type of cleaning liquid such as a solvent in which a surface acting agent is mixed with water; and a non-water type of cleaning liquid such as a petroleum solvent or an organic type solvent and the like. When the water type of cleaning liquid is used, contamination of water solubility that is attached to a washing article is washed off. However, depending on a clothing fabric or fiber of the washing article, the washing article is susceptible to hardening or damage, which worsens the condition of the washing article after washing. On the other hand, when the non-water type of cleaning liquid is used, it is possible to avoid a danger of having the washing article damaged in such a case as when the water type of cleaning liquid is used, but the contamination of water solubility cannot be completely eliminated and washed off.

For the above mentioned inconvenient case, the present applicant proposes a washing method (See Patent Publication 1.) and a washing apparatus (See Patent Publication 2.). In Patent Publication 1 and Patent Publication 2, the cleaning liquid fills the casing which includes the washing tub having its center axis in the horizontal direction, and the washing tub is rotated. As the result, the washing article being contained inside a washing tub is made to float inside a cleaning liquid and is washed. In each of the washing method of Patent Publication 1 and the washing apparatus of Patent Publication 2, the washing tub is rotated, in which concaves and convexes are provided to the inside wall surface thereof continuously in a circumferential direction. Consequently, swirling water currents are generated for each concave and convex of the inside wall surface of the washing tub in the cleaning liquid on the side of the inside wall surface of the washing tub. By having the swirling water currents formed continuously along the inside wall surface of the washing tub, a large flow is generated along the rotation of the washing tub in the cleaning liquid inside the washing tub. Because the swirling water currents and a large flow that are generated in such a manner as mentioned above influence the washing article, the washing article is made to float and spreads inside the washing tub in such a manner as drifts in the washing tub. Therefore, a contact surface of the washing article with the cleaning liquid is increased, and furthermore, a penetrating force of the cleaning liquid into the washing article is enhanced. As a result, washing effects of the cleaning liquid on contamination of the washing article are enhanced.

As the washing method of Patent Publication 1 and the washing apparatus of Patent Publication 2, a pressure distribution is formed based on the rotation of the washing tub for the cleaning liquid that fills the casing, and thereby washing is performed. As a result, the present applicant can avoid the washing article from being damaged and enhance the washing effects of the cleaning liquid that fills the casing. In addition, the pressure distribution that is formed in the cleaning liquid influences behaviors of the washing article inside the cleaning liquid. Therefore, in order to achieve the washing effects sufficiently, it is necessary for the cleaning liquid filling the casing to form the pressure distribution effectively.

Then, the present applicant performed further verification for each construction of Patent Publication 1 and Patent Publication 2. As a result, as mentioned above, it was clarified that the pressure distribution is formed inside the cleaning liquid by rotation of concave and convex surface that is provided to the inside wall surface of the washing tub continuously in a circumferential direction. Namely, in the washing tub, the concave and convex surface is formed along the rotating direction thereof. Therefore, when the washing tub rotates, the cleaning liquid inside the concave portions moves toward the direction of the rotation by the convex portions, but the cleaning liquid itself tries to remain and stay. And thereby, swirling water currents in a spiral form are generated inside the concave portions.

By having the swirling water currents in a spiral shape formed in each of the concave portions, the cleaning liquid that fills the casing flows in a radial direction of the washing tub at a different flow rate in a form of an approximately concentric circle. Consequently, a pressure distribution is formed in the radial direction of the washing tub. The pressure distribution that is formed in the radial direction of the washing tub makes the washing article float inside the washing tub. As a result, the washing article that floats and drifts inside the cleaning liquid is spread. And thereby, the washing effect is advanced and at the same time, the washing article can be prevented from being damaged.

DOCUMENTS OF THE PRIOR ART

Patent Publications

Patent Publication 1 JP-3841822
Patent Publication 2 JP-3863176

SUMMARY OF THE INVENTION

Problem to be Solved by the Invention

In each of Patent Publication 1 and Patent Publication 2, in order to have the cleaning liquid fill the casing, it was proposed to supply the cleaning liquid in a tank to the casing by a pump. In other words, before the cleaning liquid is supplied into the casing, the cleaning liquid is blended inside the tank. And after connecting a flow path of the cleaning liquid from the tank to the casing, the pump is driven. As a result, the cleaning liquid in the tank is supplied to the casing so as to have the casing filled with the cleaning liquid. When it is detected that the casing is filled with the cleaning liquid and is full, the washing tub is rotated, and washing is started.

As described above, in order to have the casing filled with the cleaning liquid, it is necessary to discharge the air in the casing. However, the constructions that are proposed in Patent Publication 1 and Patent Publication 2 do not talk about an air flow path for discharging the air. By installing the air flow path, when the cleaning liquid is supplied into the casing, the discharge of the air from the casing can be promoted, and as a result, a time to be taken for the casing to be filled with the cleaning liquid can be shortened, and also a load of the pump can be reduced.

However, when such an air flow path as mentioned above is simply provided to the casing, the cleaning liquid is discharged from the air flow path after the casing is filled with the cleaning liquid. Therefore, in order to prevent the cleaning liquid from being discharged from the air flow path that is provided to the casing, it is necessary for a worker to close the air flow path when he confirms that the casing is filled with the cleaning liquid and is full.

In order to achieve the above-mentioned object, a washing apparatus in accordance with the present invention is provided with: a washing tub that rotates by a rotating axis, which is inclined toward a horizontal direction from a vertical direction or is set to be horizontal and that has a washing article contained therein; a casing that covers the washing tub and is filled with a cleaning liquid; a liquid supply flow path that supplies the cleaning liquid to the casing; and a liquid discharge flow path that discharges the cleaning liquid from the casing. The aforementioned washing apparatus is also provided with an air flow path that is connected to the casing and opens an internal of the casing to an atmosphere; a detection portion that detects, based on an amount of the cleaning liquid flowing into the air flow path, that an internal of the casing is filled with the cleaning liquid; and a pump that sends out a cleaning liquid from the liquid discharge flow path to the liquid supply flow path. In such a washing apparatus as described above, when the washing article is washed, after containing the washing article in the washing tub, the cleaning liquid is supplied to the casing by way of the liquid supply flow path in a condition that the casing is opened to the outside air by the air flow path; and when the detection portion detects based on an amount of the cleaning liquid flowing into the air flow path that the casing is filled with the cleaning liquid, by permitting a circulation of the cleaning liquid from the liquid discharge flow path, the cleaning liquid is circulated by the pump for the casing being filled with the cleaning liquid, and at a same time, the washing tub is rotated so as to start washing of the washing article.

In the washing apparatus being described above, by providing concaves and convexes to the inside wall surface of the washing tub, the casing is filled with the cleaning liquid and the washing tub is made to rotate. Thereby, a pressure distribution is formed in the cleaning liquid inside the washing tub, and the washing article can be washed without being damaged.

Effect Of The Invention

In accordance with the present invention, in a washing apparatus in which the casing is filled with a cleaning liquid and a washing article is washed, an air flow path is installed to the casing, and thereby, the internal of the casing is opened to the outside air by way of the air flow path. As a result, it is possible to air inside and outside the casing. Then, it is possible to supply the cleaning liquid to the casing and discharge the cleaning liquid from the casing in a short time. In addition, the washing apparatus is provided with a detection portion that, based on an amount of the cleaning liquid flowing into the air flow path, detects that the casing is filled with the cleaning liquid. Therefore, it is possible to start washing surely after the casing is filled with the cleaning liquid. Furthermore, because a pump which circulates the cleaning liquid is provided, it is possible to supply the cleaning liquid to the casing and discharge the cleaning liquid from the casing during washing. Consequently, it is possible to avoid the cleaning liquid from stagnating inside the casing after washing, and as a result, washing effects of the washing article can be enhanced.

DETAILED DESCRIPTION OF EXEMPLARY EMBODIMENTS (Basic Construction)

Figure 1:
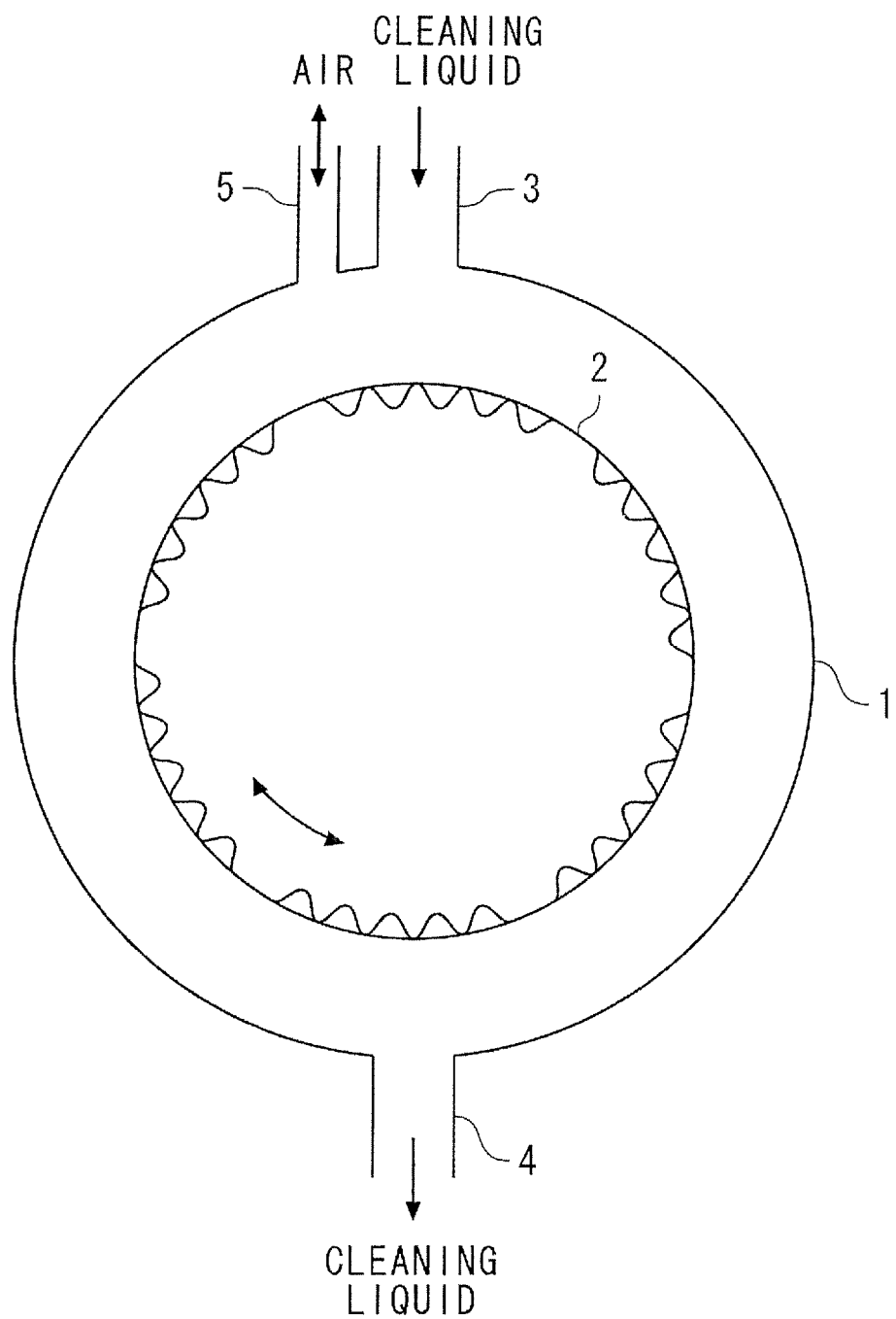
FIG. 1 is a schematic drawing that shows a relation of each flow path in a surrounding of a casing that constructs a washing apparatus of the present invention.
Figure 2:
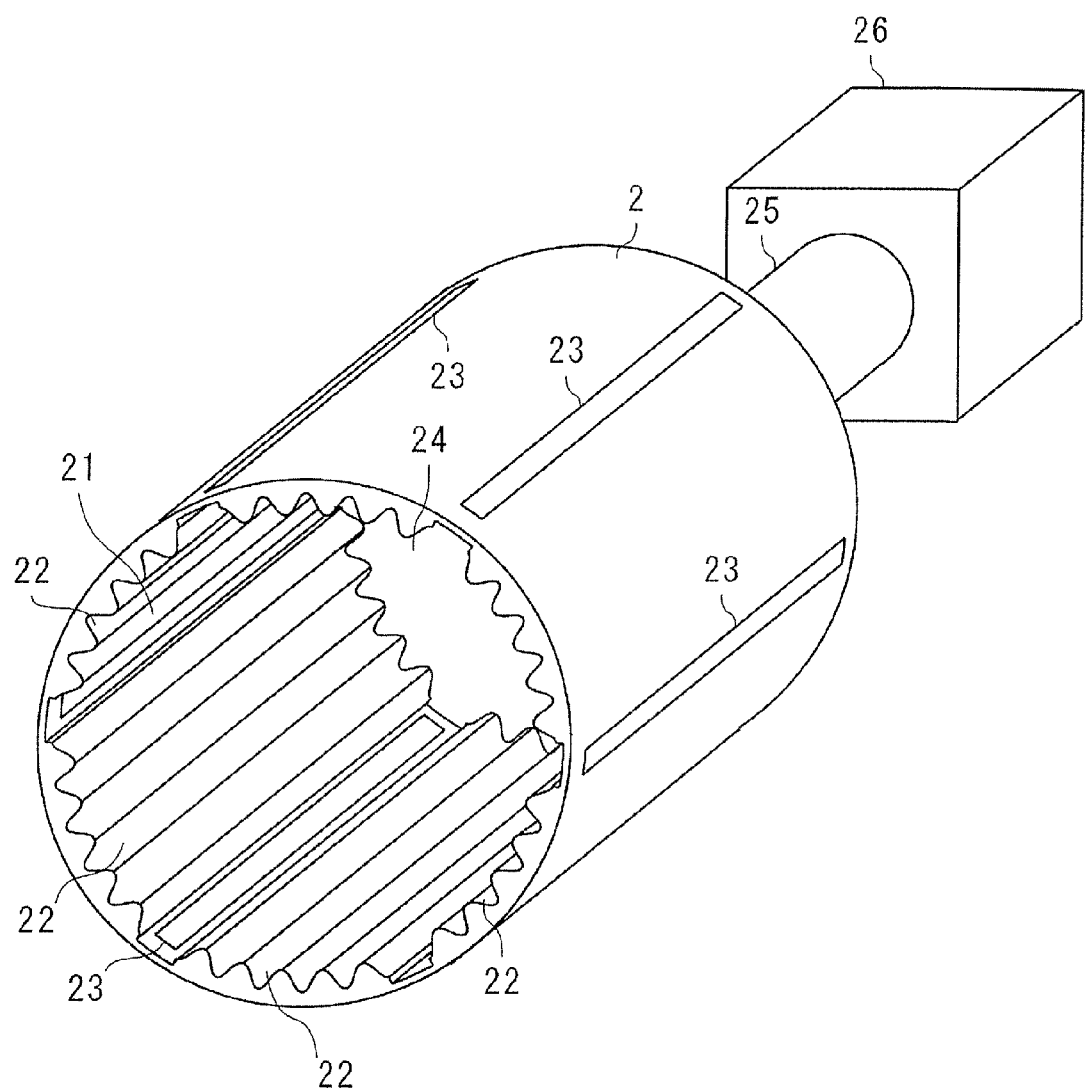
FIG. 2 is a schematic perspective view that shows a construction of a washing tub being installed inside the casing of a washing apparatus of the present invention.
Figure 3:
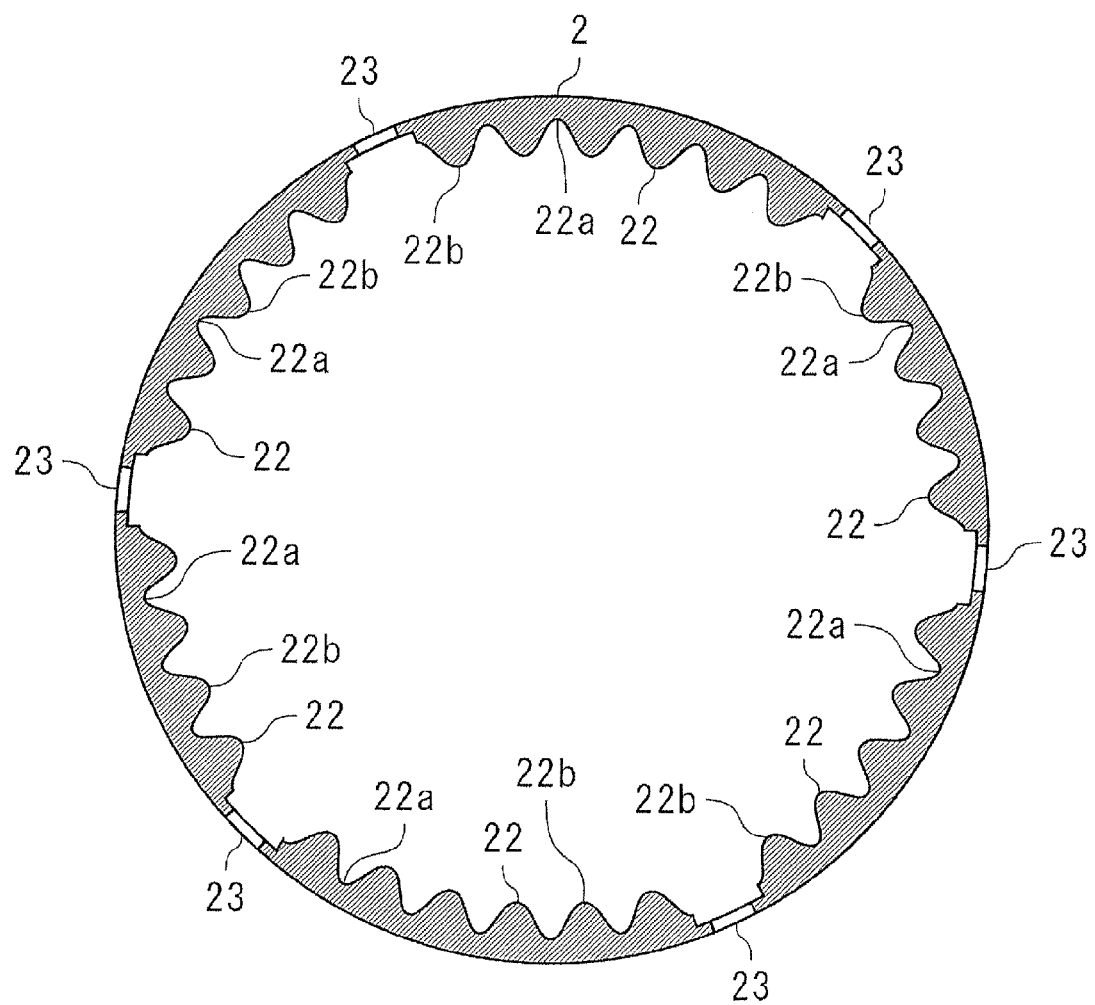
FIG. 3 is a schematic cross sectional view of a washing tub that is vertical to a rotating axis of the washing tub shown in FIG. 2.
Figure 4:
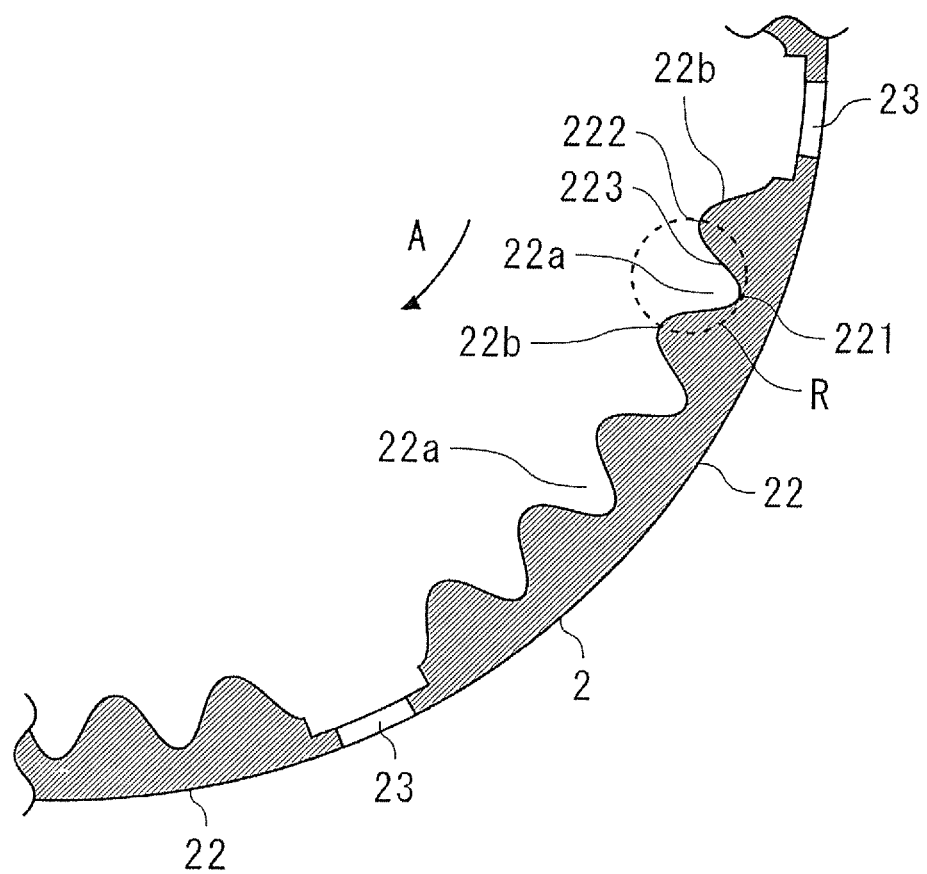
FIG. 4 is an enlarged view of main sections of the washing tub shown in FIG. 3.

Basic construction of a washing apparatus of the present invention will be described by referring to the drawings. FIG. 1 is a schematic drawing that shows a relation of each flow path in a surrounding of a casing that constructs a washing apparatus of the present invention. In addition, FIG. 2 is a schematic perspective view that shows a construction of a washing tub being installed inside the casing of the washing apparatus of the present invention. FIG. 3 is a schematic cross sectional view of a washing tub that is vertical to a rotating axis of the washing tub shown in FIG. 2; and FIG. 4 is an enlarged view of main sections of the washing tub shown in FIG. 3.

1. Washing Flow by a Washing Apparatus

As shown in FIG. 1, a basic construction of a washing apparatus of the present invention is provided, as main sections, with a casing 1 that is filled with a cleaning liquid therein; a washing tub 2 that is in a cylindrical form and installed inside the casing 1; a liquid supply flow path 3 that supplies a cleaning liquid to the casing 1; a liquid discharge flow path 4 that discharges the cleaning liquid from the casing 1; and an air flow path 5 that discharges and sucks the air that is inside the casing 1. Then, the washing tub 2 has a central axis thereof inclined from a vertical direction to a horizontal direction, and rotates inside the casing 1 with the central axis serving as the center. In addition, the casing 1 is not limited to being in a cylindrical form having a cross section which is concentric to the washing tub 2, but may be formed so as to have the washing tub 2 freely rotate therein.

In such a washing apparatus as described above, when the casing 1 is filled with a cleaning liquid, the cleaning liquid is supplied from the liquid supply flow path 3, with the liquid discharge flow path 4 closed by a valve. At this time, by having the air flow path 5 opened, the air inside the casing 1 is discharged to an outside air through the air flow path 5. Consequently, because the air inside the casing 1 is discharged by replacing with the cleaning liquid being supplied from the liquid supply flow path 3, the cleaning liquid can be supplied into the casing 1 smoothly, and a load that is applied to a non-illustrated pump which is used for supply of the cleaning liquid can be reduced.

Then, when the casing 1 is filled with the cleaning liquid, the liquid discharge flow path 4 is opened and the cleaning liquid being discharged from the liquid discharge flow path 4 is made to flow to the liquid supply flow path 3 by the non-illustrated pump, and thereby, the cleaning liquid being discharged is supplied to the casing 1 again. In other words, by supplying the cleaning liquid by way of the liquid supply flow path 3 and discharging the cleaning liquid by way of the liquid discharge flow path 4, the cleaning liquid circulates in the casing 1. At this time, inside the casing 1 that is filled with the cleaning liquid, the washing tub 2 rotates with a rotating axis serving as a center, and a washing article being contained inside the washing tub 2 is washed by the cleaning liquid. The construction of the washing tub 2 and washing by rotating of the washing tub 2 will be described hereafter.

By filling the casing 1 with the cleaning liquid and circulating the cleaning liquid by utilizing the liquid supply flow path 3 and the liquid discharge flow path 4, the cleaning liquid also circulates inside the washing tub 2 that rotates inside the casing 1. At this time, the cleaning liquid being discharged from the liquid discharge flow path 4 may be purified and reused by being provided with waste liquid treatment such as filtration and the like. In addition, the air flow path 5 may be constructed so as to be closed at the same time when the casing 1 is filled with the cleaning liquid by being provided with an air valve being equipped with a float valve body, and the like. The air flow path 5 may also be constructed so as to be used as a liquid discharge flow path after the casing 1 is filled with the cleaning liquid. The air flow path 5 will be described hereafter in each of the embodiments.

The cleaning liquid that fills the casing 1 may either be a water type of cleaning liquid or a non-water type of cleaning liquid. For the water type of cleaning liquid, water or water being blended with a surface acting agent is used. Contamination of water solubility can be washed off by this water type of cleaning liquid. In addition, when a surface acting agent is blended, oily contamination can be washed off by having the surface acting agent react chemically. On the other hand, as the non-water type of cleaning liquid, a petroleum (hydrocarbon) solvent or an organic solvent and the like are used. The non-water type of cleaning liquid has characteristics that it can wash off oily contamination and that it has better drying characteristic, being compared with the water type of cleaning liquid.

After finishing washing by circulating the cleaning liquid, which fills the casing 1, with the liquid supply flow path 3 and the liquid discharge flow path 4, the cleaning liquid that fills the casing 1 is discharged in order to take out a washing article that is contained in the washing tub 2 of the casing 1. At this time, the cleaning liquid can be discharged from a circulating path of the cleaning liquid, comprising the casing 1, the liquid supply flow path 3 and the liquid discharge flow path 4, by having the cleaning liquid discharged from a non-illustrated drain pipe that branches from the flow path from the liquid discharge flow path 4 to a non-illustrated pump. In addition, by having the air flow path 5 opened to the outside air, the air is supplied into the casing 1 from the outside air. As a result, the internal of the casing 1 is opened to the atmosphere, and thereby, all the cleaning liquid inside the casing 1 can be discharged.

In such a manner as described above, after the cleaning liquid fills the casing 1, the washing article is washed by circulation of the cleaning liquid and rotation of the washing tub 2. When the washing of the washing article is completed, all the cleaning liquid filling the casing 1 and circulating is discharged. At this time, the cleaning liquid to be discharged may be purified and reused by being provided with waste liquid treatment such as filtration and the like. Then, when the washing employs the water type of cleaning liquid which is blended with a surface acting agent, the washing article is rinsed by circulation of water and rotation of the washing tub 2 after the casing 1 is filled with water in the same manner as the behaviors of the washing mentioned above.

In addition, for example, in a case where washing is performed with the casing 1 filled with a water type of cleaning liquid after another washing is performed with the casing 1 filled with a non-water type of cleaning liquid, behaviors of the washing work process to be described hereafter are the same even though washing is performed by using different kinds of cleaning liquid. In other words, the washing work process that includes filling the casing 1 with the cleaning liquid, circulation of the cleaning liquid, rotation of the washing tub 2, and discharge of the cleaning liquid from the casing 1 is repeated for each of different kinds of the cleaning liquid. As a result, a plural of washing by using different kinds of cleaning liquid and rinsing can be provided to the washing article 2. Construction of the Washing Tub and Washing by Rotation of the Washing Tub As mentioned above, by having the washing tub 2 containing a washing article therein rotate inside the casing 1 that is filled with a cleaning liquid, a pressure distribution is formed in the cleaning liquid inside the washing tub 2. Thereby, the washing article can be washed by a flow of the cleaning liquid inside the washing tub 2, without being damaged. In explaining the washing that utilizes the flow of the cleaning liquid, first of all, the construction of the washing tub 2 that forms a flow for the cleaning liquid filling the casing 1 will be described by referring to FIG. 2 through FIG. 4.

As shown in FIG. 2, the washing tub 2 that is constructed in a cylindrical form having a rotating axis thereof inclined from a vertical direction to a horizontal direction is formed in a basket that has one of bottom surfaces thereof provided with an opening 21 which is opened. The inside wall surface of the washing tub 2 is provided with a concave and convex curved surface 22 whose cross section, being vertical to a rotating axis of the washing tub 2, is formed in continuous concave and convex forms in the circumferential direction. The inside wall surface of the washing tub 2 is also provided with slits 23 that are opened in a direction being parallel to the direction of the rotating axis of the washing tub 2 that serves as the longitudinal direction of the slit 23. Then, as shown in FIG. 3, the concave and convex curved surface 22 and the slits 23 are formed alternatively along the circumferential direction on a cross section of the inside wall surface of the washing tub 2 that is vertical to the rotating axis of the washing tub 2.

As shown in FIG. 2, the concave and convex curved surface 22 being provided to the inside wall surface of the washing tub 2 is formed by a curved surface. This curved surface is formed by connecting concave and convex cross sections, that are vertical to the rotating axis of the washing tub 2, continuously along the direction of the rotating axis of the washing tub 2. Namely, concave portions 22a and convex portions 22b (See FIG. 3.) that have the direction of the rotating axis of the washing tub 2 serve as the longitudinal direction thereof, respectively, continue to be formed alternatively along the circumferential direction that is vertical to the rotating axis of the washing tub 2. And thereby, the concave and convex curved surface 22 is constructed on the inside wall surface of the washing tub 2. In addition, because the slits 23 go through from the inside wall to the outside wall of the washing tub 2, the cleaning liquid inside the washing tub 2 is discharged to a region between the casing 1 and the washing tub 2 through the slits 23, and also the cleaning liquid in the region between the casing 1 and the washing tub 2 flows into the washing tub 2 through the slits 23.

Additionally, in the construction of FIG. 2, the slits 23 are opened with the direction of the rotating axis of the washing tub 2 serving as the longitudinal direction thereof. However, the slits may be formed by a plural of holes that are arranged along the direction of the rotating axis of the washing tub 2. In addition, the slits 23 may be provided not only to the inside wall surface serving as the peripheral surface of the washing tub 2, but also to the bottom surface 24 that is opposite to the opening 21. Also, a gap may be provided between the casing 1 (See FIG. 1.) and the opening 21. Moreover, the slits 23 may be provided between the casing 1 and the opening 21 or may be provided only on the bottom surface 24. Furthermore, the construction of the washing tub 2 is not limited to the construction, in which the concave and convex curved surface 22 and the slits 23 are formed on the inside wall surface thereof alternatively. For example, the construction of the washing tub 2 may be such as the concave and convex curved surface 22 is formed on all the periphery of the inside wall surface of the washing tub 2 with the slits 23 being provided to a part of the concave portions 22a (See FIG. 3.).

As shown in FIG. 3, in a washing tub 2 being constructed in the above-mentioned manner, the concave and convex curved surface 22 is provided between the slits 23 being adjacent in the circumferential direction of the washing tub 2, and the concave and convex curved surface 22 has a plural of concave portions 22a and a plural of convex portions 22b formed alternatively. At this time, as shown in FIG. 4, by making the change of the forms of the bottoms 221 of the concave portions 22a, the tops 222 of the convex portions 22b and connecting portions 223 of the concave portions 22a to the convex portions 22b, respectively, be moderate, the curved line of a circumferential cross section of the concave and convex curved surface 22 is made to be smooth.

As a result, when the concave and convex curved surface 22 rotates along the circumferential direction of the washing tub 2, it is possible to restrain a disturbance being given to a flow for the liquid inside the concave portions 22a that is formed by the convex portions 22b. The concave and convex curved surface 22 may be formed so as to be of a same width for the circumferential direction of the washing tub 2; and may have different width along the circumferential direction of the washing tub 2, as shown in FIG. 3. In addition, the concave and convex curved surface 22 may be formed of a thin metal plate that is curved, and may be provided to the inside wall surface of the washing tub 2 in a form of a cylindrical basket which is provided with the slits 23.

Then, as shown in FIG. 2, in the washing tub 2, the rotating axis 25 of a driving mechanism 26 that rotates the washing tub 2 is connected to the central position of the bottom 24 of the washing tub 2. In addition, the driving mechanism 26 may consist of an electric motor that is provided with the rotating axis 25, or may consist of an electric motor that rotates the rotating axis 25 indirectly, a pully and a belt that transmit the rotation of the electric motor to the rotating axis 25. In addition, because the driving mechanism 26 is provided to the outside of the non-illustrated casing 1 in FIG. 2, the rotating axis 25 is inserted into the casing 1 and connected to the washing tub 2. Consequently, the casing 1 is provided with a bearing portion where the rotating axis 25 is inserted. The bearing portion is equipped with a sealing construction that prevents the cleaning liquid in the casing 1 from leaking outside.

The washing tub 2 having constructions that are shown in FIG. 2 through FIG. 4 rotates inside the casing 1 which is filled with the cleaning liquid, by a rotating force that is transmitted from the driving mechanism 26 by way of the rotating axis 25. And thereby, the washing article being contained inside the washing tub 2 is washed or rinsed. The behaviors of the cleaning liquid and the relation between the behaviors of the cleaning liquid and the washing article inside the washing tub 2 will be explained briefly by referring to FIG. 3 and FIG. 4.

When the washing tub 2 rotates in the direction of an arrow A shown in FIG. 4, for the rotating direction (Arrow A), the convex portion 22b behind the concave portion 22a moves to a position of the concave portion 22a, so that the cleaning liquid inside a region "R" being surrounded by two convex portions 22b on both sides of the concave portion 22a and by the concave portion 22a moves to the rotating direction (Arrow A). However, at a location inside the region "R" that is closer to the top 222 of the convex portion 22b, the gap of the convex portion 22b between both sides of the concave portion 22a becomes wide, and thereby, an effect being given by the move of the convex portion 22b becomes less. As a result, the cleaning liquid on the side that is closer to the top 222 of the convex portion 22b tries to remain and stay, and thereby, a big flow is formed along the convex portion 22b that is rotating along the Arrow A.

As mentioned above, the cleaning liquid in the neighborhood of the inside wall surface of the washing tub 2 forms a large flow along the rotating direction thereof (Arrow A) by rotation of the concave and convex curved surface 22, and also forms swirling currents along the concave portions 22a and the convex portions 22b inside each region "R" that is formed by the concave portion 22a and the convex portion 22b on the concave and convex curved surface 22. On the other hand, the cleaning liquid in a region on the side of the rotating axis of the washing tub 2 is away from the concave and convex curved surface 22, so that an effect of rotation of the concave and convex curved surface 22 is small. As a result, a big flow along the rotating direction (Arrow A) that is formed by the rotation of the concave and convex curved surface 22 and swirling currents along the concave portions 22a and the convex portions 22b are transmitted in a radial direction toward a central axis of the washing tub 2.

Consequently, in the cleaning liquid inside the washing tub 2, layers of flow of the cleaning liquid that are at a different flow speed are formed from the inside wall surface of the washing tub 2 toward the rotating axis of the washing tub 2 on a cross section that is vertical to the rotation axis of the washing tub 2. In other words, inside the washing tub 2, a layer of flow of cleaning liquid that is at the fastest speed is formed on the inside wall surface in a circumferential direction, and layers of flow of the cleaning liquid that are at a slower speed are formed toward the rotating axis of the washing tub 2. As a result, for the cleaning liquid filling the washing tub 2, a pressure distribution is formed in a radial direction from the inside wall surface to the rotating axis, and a washing article floats in the cleaning liquid, based on the pressure distribution. In other words, by effects of the pressure distribution and buoyancy that are generated in the cleaning liquid, the washing article inside the cleaning liquid filling the washing tub 2 behaves in such a manner as floats in a zero gravity. Consequently, the washing article inside the washing tub 2 floats in the cleaning liquid, spreading.

Because a pressure distribution is formed by having layers that are different in a flow speed formed in the cleaning liquid inside the washing tub 2, the washing article in the cleaning liquid performs behaviors that are influenced by a fast flow of the cleaning liquid when the washing article moves to the inside wall surface side of the washing tub 2. In other words, a big flow in the rotation direction exists, and swirling currents being formed by the concave and convex curved surface 22 exist. As a result, by the flow of the cleaning liquid, not only the washing article is prevented from bumping against the inside wall surface of the washing tub 2 but also the washing article is forced to move to the rotating axis. In addition, because a pressure distribution is formed because of a difference in the flow speed of the cleaning liquid, the washing article that is influenced by the flow speed of each layer floats in the cleaning liquid and spreads. And thereby, because a surface of the washing article being contact with liquid molecules of the cleaning liquid spreads, effects of washing and rinsing by the cleaning liquid are enhanced. In addition, burdens, such as twist based on the flow of the cleaning liquid and impact against the washing tub, are mitigated, which reduces a damage of the washing article being caused by washing.

By having the washing tub 2 rotate, a pressure distribution is formed in the cleaning liquid inside the washing tub 2, so that the washing article is spread and floats in the cleaning liquid. As a result, the washing article can be washed or rinsed. The rotation of the washing tub 2 for washing or rinsing of the washing article may be performed by performing only rotation in a definite direction continuously for a predetermined time, or may be performed by having the rotation in a definite direction performed intermittently at an interval of a predetermined time. In other words, the washing tub 2 may be rotated continuously for a definite time in the direction of normal rotation (or in the direction of reverse rotation), or may repeat the time of rotation of the washing tub 2 in the direction of normal rotation (or in the direction of reverse rotation) and the time of stoppage of rotation of the washing tub 2 for a course of a definite time. Moreover, in a case of performing rotation of the washing tub 2 for washing or rinsing intermittently, the direction of the rotation can be changed over to a reverse direction for each rotation that starts intermittently. Namely, the time of rotation of the washing tub 2 and the time of stoppage of rotation of the washing tub 2 may be repeated for a course of a definite time; and for each of the time of rotation, the direction of rotation of the washing tub 2 may be changed over between the direction of normal rotation and the direction of reverse direction.

A washing apparatus in accordance with each of the following embodiments commonly has the construction of the washing apparatus that is explained in the above "Basic Construction." In addition, the washing apparatus in accordance with each of the following embodiments commonly performs behaviors of each process in washing that are explained in the above "Basic Construction." Therefore, a characteristic part of the washing apparatus in accordance with each embodiment will be described in details hereinafter, and an explanation of a part that is common to the "Basic Construction" will be omitted.

[Embodiment 1]

Figure 5:
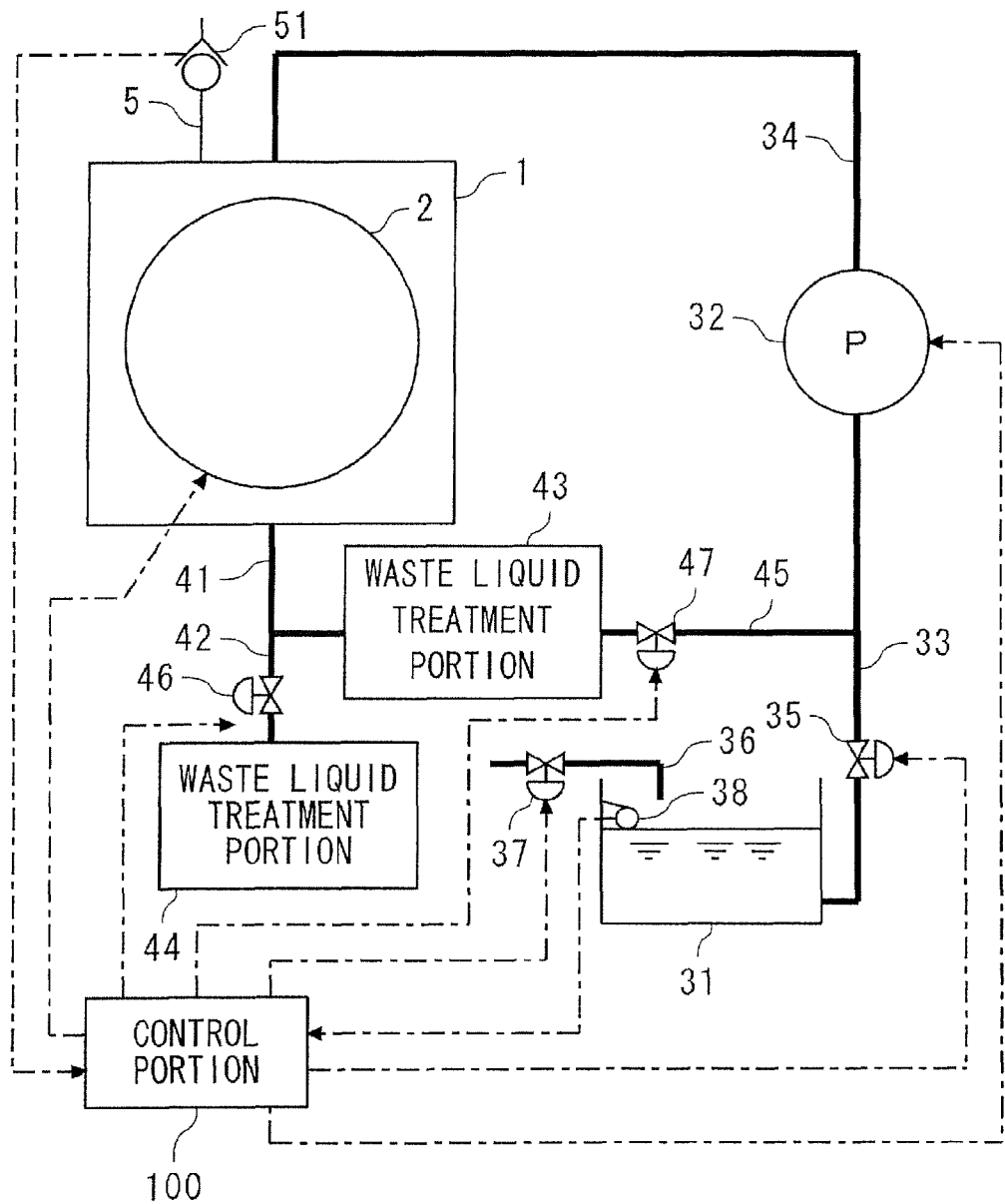
FIG. 5 is a block diagram that shows an approximate arrangement of pipes in a washing apparatus in accordance with a first embodiment of the present invention.

A first embodiment of a washing apparatus of the present invention will be described hereafter by referring to the drawings. FIG. 5 is a block diagram that shows an approximate arrangement of pipes in a washing apparatus in accordance with the present embodiment. The washing apparatus in accordance with the present embodiment is provided with a casing 1 and a washing tub 2 that have a construction being explained in the above-mentioned "Basic Construction," wherein each flow path being illustrated in FIG. 5 is provided for filling the casing 1 with a cleaning liquid.

(Construction of a Washing Apparatus)

As shown in FIG. 5, for the liquid supply flow path 3 (See FIG. 1.), a washing apparatus is provided with a tank 31 that stores the cleaning liquid temporarily; a pump 32 that sucks the cleaning liquid being stored in the tank 31; a pump suction side pipe 33 that connects the tank 31 to the pump 32; a pump discharge side pipe 34 that connects the pump 32 to the casing 1; and a control valve 35 that is installed to the pump suction side pipe 33. In addition, the tank 31 is provided with a tank supply pipe 36 that supplies the cleaning liquid to the tank 31 and has a control valve 37; and a liquid amount detection sensor 38 that detects an amount of the cleaning liquid in the tank 31. When the liquid amount detection sensor 38, for example, comprises a level sensor that is provided with a float floating on the surface of the cleaning liquid in the tank 31, the liquid amount detection sensor 38 can convert an angle, height and location of a joint being connected to the float into an electrical signal that shows the amount of the cleaning liquid and can output the electrical signal.

For the liquid discharge flow path 4 (See FIG. 1.), are provided a liquid discharge pipe 41 that is connected to the casing 1; a drain pipe 42 that branches from the liquid discharge pipe 41; waste liquid treatment portions 43 and 44 that are connected to the liquid discharge pipe 41 and to the drain pipe 42, respectively; a waste liquid treatment portion discharge side pipe 45 that connects the waste liquid treatment portion 43 to the pump 32; and control valves 46 and 47 that are provided to the drain pipe 42 and the waste liquid treatment portion discharge side pipe 45, respectively. The waste liquid treatment portion discharge side pipe 45 branches from a position between the pump 32 and the control valve 35 in the pump suction side pipe 33. In addition, because the liquid discharge flow path 4 discharges the cleaning liquid to the outside of the casing 1 by way of the drain pipe 42, it is desirable that the liquid discharge flow path 4 is formed vertically under the casing 1.

Moreover, an air flow path 5 is formed vertically on the upper side of the casing 1, and the air flow path 5 is provided with an air valve 51 that prevents the cleaning liquid from being discharged to the outside when the casing 1 is full of the cleaning liquid. The air valve 51, for example, may be formed in double tubes and provided to the end of the air flow path 5, wherein the outside tube may be opened to the atmosphere and the inside tube being connected through the outside tube may be provided with a float valve body that slides and moves while contacting the tube wall of the inside tube. At this time, the outside tube is provided with a hole for opening to the atmosphere, wherein the inside diameter of the hole for opening to the atmosphere is smaller than the outside diameter of the float valve body.

By being constructed as described hereinabove, when the air is discharged from the casing 1 through the air flow path 5, the air is discharged to the outside air, passing through a gap between the outside tube and the inside tube that construct the air valve 51. When the cleaning liquid flows into the air flow path 5, the cleaning liquid flows into each of the outside and the inside tubes, but the hole for opening to the atmosphere that is provided to the outside tube is closed by the float valve body that slides and moves in the inside tube. By this closure of the hole for opening to the atmosphere by the float valve body, it is possible to prevent the cleaning liquid from leaking to the outside through the hole for opening to the atmosphere that is provided to the outside tube.

Such an air valve 51 as described above is further provided with a construction that can electrically provide conduction when the hole for opening to the atmosphere contacts the float valve body. As such construction, for example, a conductor is provided to a part where the hole for opening to the atmosphere being provided to the outside tube contacts the float valve body. By the construction of the air valve 51, when the casing 1 is full of the cleaning liquid, the air valve 51 can prohibit discharge of the cleaning liquid by having the float valve body close the hole for opening to the atmosphere, and can generate an electrical signal that informs of being full of the cleaning liquid.

Furthermore, the washing apparatus shown in FIG. 5 is provided with a control portion 100 that receives electrical signals from the liquid amount detection sensor 38 and the air valve 51, and controls driving of the pump 32 and opening and closing of the control valves 35, 37, 46 and 47. In other words, when the washing apparatus performs washing, the control portion 100 detects based on an electrical signal from the air valve 51 that the casing 1 is full of the cleaning liquid. In addition, the control portion 100 controls opening and closing of the control valves 35, 37, 46 and 47 and determines a pipe to be connected to the casing 1 so as to establish a flow path as well as controls driving of the pump 32, and as a result, supply, discharge and circulation of the cleaning liquid is performed.

(Control Flow by Washing)

1. Supply of the Cleaning Liquid

Next, will be explained hereinafter the control flow for each of the processes in washing being performed by a washing apparatus that is provided with pipes whose arrangement is shown in FIG. 5. The control portion 100 supplies a control signal to the control valve 35 and the pump 32, respectively, by which the control valve 35 is closed and the pump 32 stops. Then, by having the control portion 100 provide a control signal to the control valve 37, the control valve 37 is opened, and thereby, the cleaning liquid is supplied to the tank 31 by way of the tank supply pipe 36. In addition, the control valve 35 is closed for prohibiting the supply of the cleaning liquid to the casing 1 and for supplying the cleaning liquid to the tank 31. And the control valves 46 and 47 may either be opened or closed as long as the control valve 35 is closed.

Because the casing 1 is opened to the atmosphere by the air valve 51 at this time, a worker can open a non-illustrated door being provided to the casing 1 and put a washing article into the washing tub 2. After the washing article is put into the washing tub 2, the worker closes the non-illustrated door and closes the casing 1. In addition, in order to have the washing article put into the casing 1, performance of putting in may not be executed by a worker but may be executed automatically by a carry-in equipment. Also, when a water type of cleaning liquid which is mixed with a surface acting agent is used as the cleaning liquid which fills the casing 1, inside the tank 31, a surface acting agent is blended to the water which is to be supplied through the tank supply pipe 36.

When the cleaning liquid is supplied to the tank 31 and stored in the tank 31, as described hereinabove, an electrical signal from the liquid amount detection sensor 38 being provided inside the tank 31 is given to the control portion 100, so as to detect the amount of the cleaning liquid inside the tank 31. Then, based on the electrical signal from the liquid amount detection sensor 38, it is confirmed that the amount of the cleaning liquid being stored in the tank 31 is sufficiently more than an amount of a total of the capacity of the casing 1 and the capacity of the circulation path of the cleaning liquid for the casing 1, that is formed by the pump 32, the pump suction side pipe 33, the pump discharge side pipe 34, the liquid discharge pipe 41, the waste liquid treatment portion 43 and the waste liquid treatment portion discharge side pipe 45. In other words, based on an electrical signal from the liquid amount detection sensor 38, it is confirmed whether or not the amount of the cleaning liquid being stored in the tank 31 is sufficient enough for the cleaning liquid to fill the casing 1 and circulate the casing 1.

2. Filling of the Casing

Then, when the control portion 100 confirms by an electrical signal from the liquid amount detection sensor 38 that the cleaning liquid being sufficient enough to fill the casing 1 and circulate is stored in the tank 31, the control portion 100 supplies a control signal to the control valve 37 so as to close the control valve 37. As a result, the supply of the cleaning liquid to the tank 31 by the tank supply pipe 36 is stopped. Then, by giving a control signal to the control valves 35, 46 and 47, while the control portion 100 opens the control valves 35 and 47, the control portion 100 closes the control valve 46. Namely, a circulation path of the cleaning liquid including the casing 1 is opened, and at the same time a supply path of the cleaning liquid from the tank 31 to the pump 32 is opened. When a flow path of the cleaning liquid is formed as described above, the pump 32 is driven to suck the cleaning liquid in the tank 31 and starts supply of the cleaning liquid to the casing 1. In addition, in order to reduce a burden of the pump 32, at the beginning, the control valve 47 may be closed, and the control valve 47 may be opened after suction of the cleaning liquid is started by driving the pump 32.

When the pump 32 starts driving, the cleaning liquid in the tank 31 is sucked to the pump 32 by way of the pump suction side pipe 33, and subsequently is supplied to the casing 1 by way of the pump discharge side pipe 34. The cleaning liquid being supplied to the casing 1 flows into the liquid discharge pipe 41, the waste liquid treatment portion 43, and the waste liquid treatment portion discharge side pipe 45. After the liquid discharge pipe 41, the waste liquid treatment portion 43 and the waste liquid treatment portion discharge side pipe 45 are full of the cleaning liquid, the casing 1 is full of the cleaning liquid. At this time, the air being contained in the casing 1, the pump 32, the pump suction side pipe 33, the pump discharge side pipe 34, the liquid discharge pipe 41, the waste liquid treatment portion 43 and the waste liquid treatment portion discharge side pipe 45, respectively, is discharged to the outside air by way of the air valve 51 in the air flow path 5. Then, when the casing 1 is going to be full of the cleaning liquid, the cleaning liquid flows into the air flow path 5, and thereby, the air valve 51 is closed by the cleaning liquid, which prevents the cleaning liquid from leaking from the air flow path 5.

As described hereinabove, the circulation path being formed by the casing 1, the pump 32, the pump suction side pipe 33, the pump discharge side pipe 34, the liquid discharge pipe 41, the waste liquid treatment portion 43 and the waste liquid treatment portion discharge side pipe 45 is full of the cleaning liquid, and thereby, the casing 1 is full of the cleaning liquid. At this time, because the air valve 51 is closed, an electrical signal showing that the air valve 51 is closed is given to the control portion 100, and the control portion 100 recognizes that the casing 1 is full of the cleaning liquid.

3. Washing Process

When the control portion 100 detects based on an electrical signal from the air valve 51 that the casing 1 is full of the cleaning liquid, the control portion 100 supplies a control signal to the control valve 35 and closes the control valve 35. Namely, only the control valve 47 is opened, and by driving the pump 32, the circulation of the cleaning liquid starts for the casing 1. When the circulation of the cleaning liquid for the casing 1 is started, in order to wash a washing article being contained in the washing tub 2, the control portion 100 gives a driving mechanism 26 (See FIG. 2.) a direction to start rotating drive so as to make the washing tub 2 rotate. As a result, the washing process of the washing article by the circulation of the cleaning liquid for the casing 1 and the rotation of the washing tub 2 is started.

Circulation of the cleaning liquid in the above-mentioned washing process will be explained briefly. The cleaning liquid from the pump suction side pipe 33 is sent out to the pump discharge side pipe 34 by the pump 32, and the cleaning liquid flowing through the pump discharges side pipe 34 is supplied to the casing 1. Then, inside the casing 1, by having the washing tub 2 rotate as mentioned above, a pressure distribution of the cleaning liquid is formed in the washing tub 2, and thereby a washing article is washed or rinsed. Because the washing tub 2 is provided with slits 23 being illustrated in FIG. 2, the cleaning liquid is interchanged between the outside and inside of the washing tub 2. In other words, the cleaning liquid being supplied to the casing 1 flows to the washing tub 2 through the slits 23, and the cleaning liquid finishing washing the washing article inside the washing tub 2 flows out of the washing tub 2 through the slits 23.

Then, because the cleaning liquid is supplied from the pump discharge pipe 34 and the casing 1 is full of the cleaning liquid, the cleaning liquid inside the casing 1 is discharged to the liquid discharge pipe 41. The cleaning liquid being discharged to the liquid discharge pipe 41 from the casing 1 is supplied to the waste liquid treatment portion 43, wherein the cleaning liquid is provided with regeneration treatment by filtration and the like so that impurities including contamination are eliminated by washing. The cleaning liquid being provided with regeneration treatment is discharged from the waste liquid treatment portion 43 to the waste liquid treatment portion discharge side pipe 45, and then is supplied to the pump 32 by way of the pump suction side pipe 33.

As described hereinabove, the cleaning liquid can circulate for the casing 1 by driving of the pump 32, opening of the control valve 47, and closing of the control valves 35 and 46. At this time, when it is confirmed that the contamination of the cleaning liquid is worsened, the opening of the control valve 47 may be decreased temporarily by the control portion 100, and the opening of the control valves 35 and 46 may be of the same amount. A sensor that detects the condition of contamination of the cleaning liquid consists of a sensor of optical scheme that measures the contamination by the amount of light received of a transmitted light or a scattering light; or an electrical sensor that measures the contamination by measuring an electric conductivity or an electric resistivity of the cleaning liquid; or a PH sensor that measures the PH of the cleaning liquid, and the like. As a result, for the circulation path of the cleaning liquid including the casing 1, the contaminated cleaning liquid being discharged from the casing 1 is discharged from the drain pipe 42, and a new non-contaminated cleaning liquid can be supplied from the tank 31. At this time, when the contamination of the cleaning liquid flowing through the circulation path including the casing 1 is reduced, by the control portion 100, the opening of the control valve 47 is increased again and at the same time, the control valves 35 and 46 are completely closed; and thereby washing of the washing article continues by circulating the cleaning liquid.

4. Discharge of the Cleaning Liquid

Then, the control portion 100 detects completion of the washing process being performed by circulation of the cleaning liquid and rotation of the washing tub 2, by confirming the course of a predetermined time from start of the rotation of the washing tub 2, and the like. In addition, the circulation path including the casing 1 may be provided with a sensor that measures impurities being mixed into the cleaning liquid. In this case, when the control portion 100 confirms by measurement value of the sensor that the contamination of the washing article is washed off, the control portion 100 detects the completion of the washing process. By detecting the completion of the washing process, the control portion 100 starts discharge of the cleaning liquid that fills the casing 1 in order to take the washed washing article out of the casing 1.

In other words, in order to start the discharge of the cleaning liquid filling the casing 1, the control portion 100 stops driving of the pump 32, and opens the control valve 46. As a result, the cleaning liquid in the casing 1 is discharged to the outside through the liquid discharge pipe 41 and the drain pipe 42. Because the cleaning liquid being discharged is supplied to the waste liquid treatment portion 44, regeneration treatment such as filtration and chemical treatment and the like is provided. At this time, because the level of the cleaning liquid in the air flow path 5 lowers, the air valve 51 opens, and thereby, the casing 1 is opened to the atmosphere. Consequently, the outside air can flow into the casing 1, and the internal of the casing 1 is filled with the air in place of the cleaning liquid, which promotes the discharge of the cleaning liquid.

When the cleaning liquid filling the casing 1 is completely discharged, in case of taking out of the washing article being contained in the washing tub 2, a worker opens the door of the casing 1 to take out of the washing article. In addition, when the washing article is to be rinsed after being washed, or when the washing article is to be washed with a cleaning liquid that is different from the cleaning liquid being used in the aforementioned washing, the above-mentioned washing process is performed again. For example, in a case in which the washing article is to be rinsed after being washed, when the cleaning liquid is discharged from the casing 1 in such a manner as mentioned above, the cleaning liquid is discharged from the tank 31, too. Then, same as mentioned above, first, water being employed as the cleaning liquid is supplied to the tank 31 from the tank supply pipe 36. Subsequently, water is supplied to the casing 1 by driving the pump 32, and after water fills the circulation path including the casing 1, the washing tub 2 rotates so as to perform rinsing with the water circulating. When the rinsing finishes, the water being used for rinsing is discharged from the casing 1 by the drain pipe 42.

As described hereinabove, the washing apparatus in accordance with the present embodiment is provided with the air flow path 5 for having the casing 1 opened to the atmosphere. In addition, by installing the air valve 51 to the air flow path 5, the cleaning liquid is prevented from leaking when the casing 1 is full of the cleaning liquid. As a result, it is possible to supply the cleaning liquid to the casing 1 and discharge the cleaning liquid from the casing 1 smoothly, and also it is possible to mitigate a burden of the pump 32 in supplying the cleaning liquid to the casing 1 and discharging the cleaning liquid from the casing 1.

Embodiment 2

Figure 6:
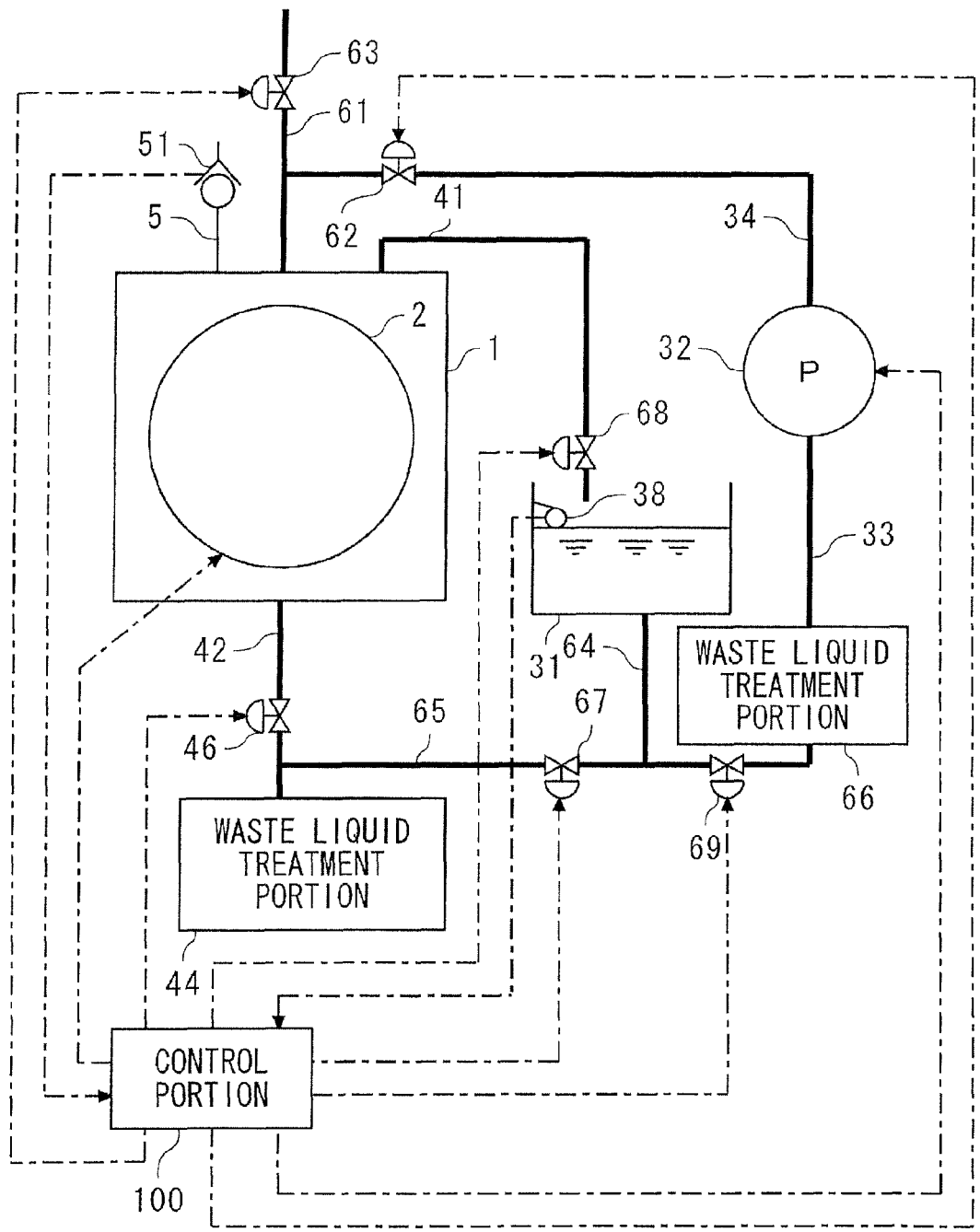
FIG. 6 is block diagram that shows an approximate arrangement of pipes in a washing apparatus in accordance with a second embodiment of the present invention

A second embodiment of a washing apparatus of the present invention will be described hereafter by referring to the drawings. FIG. 6 is a block diagram that shows an approximate arrangement of pipes in a washing apparatus in accordance with the embodiment. When a part of the construction of FIG. 6 is used for a same purpose of the construction shown in FIG. 5, a same symbol including a letter and a numeral will be given, and a detailed explanation thereof will be omitted.

(Construction of a Washing Apparatus)

Being different from the washing apparatus in accordance with the first embodiment (See FIG. 5.), in a washing apparatus in accordance with the present embodiment, a tank 31 is included in the circulation path of the cleaning liquid to be circulated for the casing 1, and the liquid discharge pipe 41 and the drain pipe 42 are installed to other locations of the casing 1. In other words, as shown in FIG. 6, in the washing apparatus in accordance with the present embodiment, the pump discharge side pipe 34, the liquid discharge pipe 41, the drain pipe 42 and the air flow path 5 are connected to the casing 1. As a result, the cleaning liquid is supplied to the casing 1 by the pump discharge side pipe 34, and the cleaning liquid is discharged by the liquid discharge pipe 41 and the drain pipe 42, so that the air is sucked and discharged by the air flow path 5.

The washing apparatus mentioned above is provided with the liquid supply pipe 61 that is connected to the pump discharges side pipe 34, instead of the tank supply pipe 36 (See FIG. 5.). As a result, the cleaning liquid is supplied to the piping system of the washing apparatus from the outside by the liquid supply pipe 61. In addition, instead of the waste liquid treatment portion 43 and the waste liquid treatment portion discharge side pipe 45, the liquid discharge pipe 64 for a tank that discharges the cleaning liquid from the tank 31 and the waste liquid treatment portion 66 that discharges to the pump suction side pipe 33 the cleaning liquid flowing from the liquid discharge pipe 64 are provided to the washing apparatus. And the liquid discharge pipe 41 is connected to the tank 31. In other words, a return flow path that regenerates the cleaning liquid, being discharged through the tank 31 from the casing 1, in the waste liquid treatment portion 66 so as to be supplied to the pump 32 is formed by the liquid discharge pipes 41 and 64 and the pump suction side pipe 33.

In addition, the washing apparatus shown in FIG. 6 has the drain pipe 42 directly connected to the casing 1; and is provided with the drain pipe 65 for a tank that branches from the liquid discharge pipe 64 and is connected to the drain pipe 42. Moreover, the control valves 62 and 63 are installed to the pump discharge side pipe 34 and the liquid supply pipe 61, respectively, and the flow amount of the cleaning liquid to be supplied to the casing 1 is controlled. Additionally, by having the control valve 67 installed to the drain pipe 65, the flow amount of the cleaning liquid to be discharged from the tank 31 is controlled. Furthermore, the control valves 68 and 69 are installed to the liquid discharge pipes 41 and 64, respectively, and the flow amount of the cleaning liquid being discharged from the casing 1 and circulating back to the casing 1 is controlled. In addition, the control valve 69 on the liquid discharge pipe 64 is installed between the branch to the drain pipe 65 and the waste liquid treatment portion 66.

Then, in the washing apparatus in FIG. 6, it is desirable that the pump discharge side pipe 34, the liquid discharge pipe 41 and the air flow path 5 are connected to the upper side of the casing 1 vertically, and that the drain pipe 42 is connected to the lower side of the casing 1 vertically. Namely, by having the liquid discharge pipe 41 installed to the upper side of the casing 1, the cleaning liquid flows from the liquid discharge pipe 41 to the tank 31 when the casing 1 is full of the cleaning liquid. In addition, by having the drain pipe 42 installed to the lower side of the casing 1, the cleaning liquid can be discharged easily from the casing 1 through the drain pipe 42 when the cleaning liquid is discharged from the piping system of the washing apparatus.

It is desirable that the liquid discharge pipe 64 is connected to the lower side of the tank 31 vertically. Thereby, when the cleaning liquid is discharged from the piping system of the washing apparatus, the cleaning liquid can easily be discharged from the tank 31 by way of the drain pipe 65. In addition, not being limited to the arrangement of FIG. 6, same as the casing 1, the drain pipe 65 and the liquid discharge pipe 64 may be connected to the tank 31 separately. At this time, by having the drain pipe 65 connected to the lower side of the tank 31, the cleaning liquid can be discharged easily from the tank 31 by way of the drain pipe 65 when the cleaning liquid is discharged from the piping system of the washing apparatus. Therefore, the position to connect the liquid discharge pipe 64 to the tank 31 is not limited to the lower side of the tank 31.

(Control Flow by Washing)

Control flow will be explained hereafter for each process of washing being performed by a washing apparatus in FIG. 6 that is constructed as described above. The control portion 100 is supplied with electrical signals of the air valve 51 and the liquid amount detection sensor 38, and outputs control signals to the control valves 46, 62, 63, 67 through 69 and the pump 32.

1. Filling of the Casing

By supplying control signals to the control valves 46, 63 and 68, the control portion 100 closes the control valves 46 and 68, and opens the control valve 63. The control portion 100 stops the pump 32, and may either open or close the control valves 62, 67 and 69. Consequently, the cleaning liquid is supplied to the casing 1 by way of the liquid supply pipe 61. Because the cleaning liquid is prohibited from flowing out from the drain pipe 42 being connected to the lower portion of the casing 1 by closing the control valve 46, the cleaning liquid fills the internal of the casing 1.

Then, when the casing 1 is full of the cleaning liquid, the air valve 51 is closed that is provided to the air flow path 5 discharging the air inside the casing 1. As a result, the control portion 100 to which an electrical signal from the air valve 51 is supplied confirms that the air valve 51 is closed. Thereby, the control portion 100 recognizes that the casing 1 is full of the cleaning liquid, and closes the control valve 69 by giving the control valve 69 a control signal, and subsequently, the control valve 68 is opened by giving a control signal to the control valve 68. Consequently, the cleaning liquid continues to be supplied through the liquid supply pipe 61, and thereby the cleaning liquid overflowing from the casing 1 is supplied to the tank 31 by way of the liquid discharge pipe 41. At this time, the opening of the control valves 63 and 68, respectively, is adjusted, which prevents the flow of the cleaning liquid to be supplied from the liquid supply pipe 61 from becoming less than the flow of the cleaning liquid to be discharged from the liquid discharge pipe 41. As a result, the casing 1 can maintain the condition that the casing 1 is full of the cleaning liquid.

By having the control valve 68 opened in the above-mentioned manner, the cleaning liquid being discharged from the casing 1 is supplied to the tank 31. At this time, because the control valves 67 and 69 are closed, the cleaning liquid is prevented from being discharged from the tank 31 to the liquid discharge pipe 64, and as a result, the cleaning liquid is stored in the tank 31. In addition, when washing is performed, using the water type of cleaning liquid where a surface acting agent is mixed, the surface acting agent is blended for the cleaning liquid being stored in the tank 31. In other words, when the cleaning liquid being supplied from the liquid supply pipe 61 is water, the surface acting agent is blended in the tank 31 after supplying the water to the casing 1 and the tank 31.

When the cleaning liquid is stored in the tank 31 as described above, the amount of the cleaning liquid being stored in the tank 31 is detected by having the control portion 100 supplied with an electrical signal from the liquid amount detection sensor 38 being installed inside the tank 31. When the control portion 100 determines by the electrical signal from the liquid amount detection sensor 38 that the amount of the cleaning liquid being stored in the tank 31 is sufficient enough for the cleaning liquid to circulate, the control valve 69 is opened by giving a control signal to the control valve 69. Subsequently, after the control portion 100 gives a control signal to the control valve 62 so as to open the control valve 62, a control signal is given to the pump 32 so as to drive the pump 32.

By having the pump 32 driven in the above-mentioned manner, the cleaning liquid flowing into the pump 32 from the tank 31 by way of the waste liquid treatment portion 66 is supplied to the casing 1 again, and thereby, the cleaning liquid starts circulation for the casing 1. After that, the control portion 100 gives a control signal to the control valve 63 so as to close the control valve 63. And the control portion 100 adjusts the opening of the control valves 62 and 68 in order to maintain the condition that that casing 1 is filled with the cleaning liquid. In other words, the opening of the control valves 62 and 68 is adjusted by the control portion 100 in order that the amount of the cleaning liquid being supplied from the pump discharge side pipe 34 is prevented from becoming less than the amount of the cleaning liquid being discharged from the liquid discharge pipe 41. In addition, in order to maintain the amount of the cleaning liquid inside the tank 31 at the predetermined amount, the control portion 100 may adjust the opening of the control valve 69 based on an electrical signal from the liquid amount detection sensor 38.

2. Washing Process

When circulation of the cleaning liquid starts in the above-mentioned manner, rotation of the washing tub 2 is started, by having the control portion 100 give the driving mechanism 26 (See FIG. 2.) a direction to start rotating drive, and a washing article being contained in the washing tub 2 is washed. In other words, by having the washing tub 2 rotate inside the casing 1 being filled with the cleaning liquid, a pressure distribution is formed in the washing tub 2 based on the distribution of the flow speed, and the above-mentioned washing of a washing article is performed. At this time, in the washing tub 2, by rotation thereof, the cleaning liquid inside the washing tub 2 and the cleaning liquid outside the washing tub 2 are replaced by slits 23 (See FIG. 2.), and the cleaning liquid inside the washing tub circulates.

The casing 1 being provided with the washing tub 2 therein is supplied with the cleaning liquid, being pumped up from the tank 31 by the pump 32, from the pump discharge side pipe 34. The cleaning liquid performing washing is discharged from the casing 1 through the liquid discharge pipe 41. The cleaning liquid being discharged from the casing 1 through the liquid discharge pipe 41 is sent to the tank 31, and stored in the tank 31 temporarily. Then, the cleaning liquid inside the tank 31 is supplied to the waste liquid treatment portion 66 by way of the liquid discharge pipe 64, and therein, the cleaning liquid is supplied with regeneration treatment. After impurities in the cleaning liquid are eliminated by the regeneration treatment, the cleaning liquid is sent to the pump 32 by way of the pump suction side pipe 33.

As described above, by having the control valves 62, 68 and 69 opened and having the control valves 46, 63 and 67 closed, the cleaning liquid can circulate for the casing 1. In the circulation path, by having the tank 31 provided, after the cleaning liquid is stored temporarily, the cleaning liquid can be supplied with regeneration treatment by the waste liquid treatment portion 66 and made to circulate. At this time, by having the control portion 100 confirm the amount of the cleaning liquid in the tank 31 by an electrical signal from the liquid amount detection sensor 38, the relation between the amount of supply of the cleaning liquid to the casing 1 and the amount of discharge of the cleaning liquid from the casing 1 may be recognized.

Namely, because the control portion 100 determines that the amount of supply of the cleaning liquid to the casing 1 is large when the amount of the cleaning liquid inside the tank 31 is small, the amount of supply of the cleaning liquid to the casing 1 is restrained by making the flow amount of the pump 32 small or by making the opening of at least one of the control valves 62 and 69 small. On the contrary, the amount of discharge of the cleaning liquid from the casing 1 may be increased by making the opening of the control valve 68 large. On the other hand, because the control portion 100 determines that the amount of supply of the cleaning liquid to the casing 1 is small when the amount of the cleaning liquid inside the tank 31 is large, the amount of supply of the cleaning liquid to the casing 1 is increased by increasing the flow amount of the pump 32 or by making the opening of both of the control valves 62 and 69 large. On the contrary, the amount of discharge from the casing 1 may be restrained by making the opening of the control valve 68 small.

Moreover, a sensor may be provided to the tank 31 to detect the condition of the cleaning liquid so as to detect contamination of the cleaning liquid. The sensor for detecting the condition of the cleaning liquid comprises various types of sensors that are described in the first embodiment. At this time, when it is confirmed that contamination of the cleaning liquid inside the tank 31 is worsened, the control portion 100 may open the control valves 63 and 46 to the same level temporarily. Thereby, for the circulation path of the cleaning liquid including the casing 1, a contaminated cleaning liquid can be discharged through the drain pipe 42 from the casing 1, and a new and non-contaminated cleaning liquid can be supplied from the liquid supply pipe 61.

Then, when the contamination of the cleaning liquid flowing through the circulation path including the casing 1 is reduced, the control portion 100, again, completely closes the control valves 63 and 46, and thereby the cleaning liquid is made to circulate and washing of the washing article continues. In addition, when a surface acting agent is blended to the cleaning liquid, the surface acting agent may be added in the tank 31 while the control valves 63 and 46 are opened. In addition, instead of opening the control valve 46, the control valve 67 may be opened, so that the contaminated cleaning liquid being discharged from the casing 1 is discharged by way of the tank 31 and the drain pipe 65.

3. Discharge of the Cleaning Liquid

Then, same as a first embodiment, the control portion 100 detects completion of the washing process being performed by circulation of the cleaning liquid and rotation of the washing tub 2, by a course of time from start of rotation of the washing tub 2 or by the condition of contamination of the cleaning liquid. In order to take out a washed washing article from the casing 1, the control portion 100 starts discharge of the cleaning liquid filling the casing 1 after detecting the completion of the washing process. In other words, same as the first embodiment, in order to start the discharge of the cleaning liquid filling the casing 1, the control portion 100 stops driving of the pump 32, and opens the control valve 46. At this time, in order to discharge the cleaning liquid to the outside from the tank 31, the control portion 100 gives a control signal to the control valve 67 so as to open the control valve 67.

As a result, the cleaning liquid inside the casing 1 is discharged to the outside by way of the drain pipe 42, and at the same time, the cleaning liquid inside the tank 31 is discharged to the outside by way of the drain pipe 65. The cleaning liquid being discharged from each of the drain pipes 42 and 65 is supplied to the waste liquid treatment portion 44, and thereby regeneration treatment such as filtration and chemical treatment and the like is performed. At this time, same as the first embodiment, the level of the cleaning liquid in the air flow path 5 lowers, so that the air valve 51 opens and the casing 1 is opened to the atmosphere. As a result, the internal of the casing 1 is full of the air instead of the cleaning liquid, which promotes the discharge of the cleaning liquid. Subsequently, in case of taking out the washed washing article being contained in the washing tub 2, a worker opens the door of the casing 1 and takes out the washing article, same as the first embodiment. In addition, when the washing article is to be rinsed after being washed, or when the washing article is to be washed with a cleaning liquid that is different from the cleaning liquid being used in the aforementioned washing, the above-mentioned washing process is performed again.

Being different from the first embodiment, in the washing apparatus in accordance with the present embodiment, the tank 31 is included in the circulation path of the cleaning liquid for the casing 1. As a result, the cleaning liquid being discharged from the casing 1 can be stored in the tank 31 temporarily, so that it is possible to confirm in the tank 31 the degree of filling of the cleaning liquid inside the casing 1 and the degree of contamination of the cleaning liquid. Consequently, it is possible to change timely the condition and flow amount of the cleaning liquid so as to be appropriate to washing, by controlling each portion inside the circulation path based on the condition and the flow amount of the cleaning liquid that is circulating.

Embodiment 3

Figure 7:
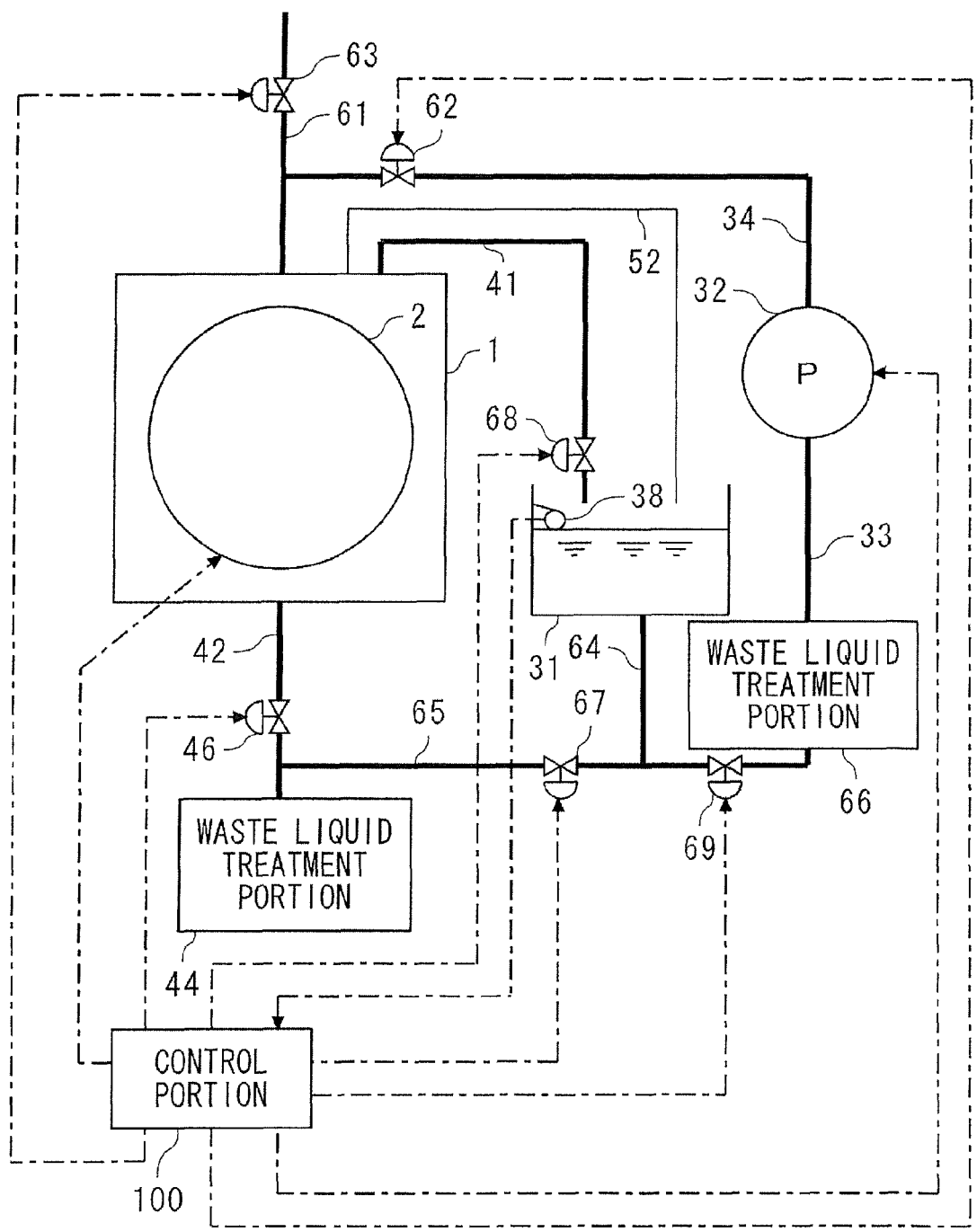
FIG. 7 is block diagram that shows an approximate arrangement of pipes in a washing apparatus in accordance with a third embodiment of the present invention

A third embodiment of a washing apparatus of the present invention will be described hereafter by referring to the drawings. FIG. 7 is a block diagram that shows an approximate arrangement of pipes in a washing apparatus in accordance with the embodiment of the present invention. When a part of the construction of FIG. 7 is used for a same purpose of the construction shown in FIG. 6, a same symbol including a letter and a numeral will be given, and a detailed explanation thereof will be omitted.

(Construction of a Washing Apparatus)

Being different from the washing apparatus in accordance with the second embodiment (See FIG. 6.), a washing apparatus in accordance with the present embodiment is provided with an air inlet and outlet pipe 52 that connects the casing 1 to the tank 31 as the air flow path 5, and the air valve 51 is removed. In addition, the tank 31 is opened to the atmosphere, and same as the air flow path 5 in the first and the second embodiments, the air inlet and outlet pipe 52 is installed to the upper portion of the casing 1 when viewed vertically. As a result, the casing 1 is opened to the atmosphere by way of the air inlet and outlet pipe 52 and the tank 31. In addition, although the details will be described hereafter, after the casing 1 is filled with the cleaning liquid, the cleaning liquid flows to the air inlet and outlet pipe 52 and then to the tank 31, so that the air inlet and outlet pipe 52 performs the same function as the liquid discharge pipe 41.

(Control Flow by Washing)

1. Filling of the Casing

Control flow will be explained hereafter for each process of washing being performed by a washing apparatus in FIG. 7 that is constructed as described above. By giving a control signal to the control valves 46, 63, and 67 through 69, the control portion 100 closes the control valves 46 and 67 through 69, and opens the control valve 63. In addition, the control portion 100 stops the pump 32, and may open or close the control valve 62. Thereby, same as a second embodiment, the cleaning liquid is supplied to the casing 1 by way of the liquid supply pipe 61. Because the cleaning liquid is prohibited from flowing out from the drain pipe 42 that is connected to the lower part of the casing 1, with the control valve 46 closed, the casing 1 is full of the cleaning liquid.

While the cleaning liquid is filling the casing 1 in the above-mentioned manner, the air inside the casing 1 is discharged to the tank 31 being opened to the atmosphere by way of the air inlet and outlet pipe 52, and then is discharged to the atmosphere by way of the tank 31. Then, when the casing 1 is full of the cleaning liquid, the cleaning liquid flows into the air inlet and outlet pipe 52, so that the cleaning liquid is supplied to the tank 31 by way of the air inlet and outlet pipe 52. At this time, because the control valves 67 and 69 are closed, the cleaning liquid is not discharged from the tank 31, and as a result, the cleaning liquid is stored in the tank 31. In addition, the opening of the control valve 63 is adjusted, which prevents the flow amount of the cleaning liquid being supplied from the liquid supply pipe 61 from becoming less than the flow amount of the cleaning liquid being discharged from the air inlet and outlet pipe 52. Then, as a result, the casing 1 can maintain the condition that the casing 1 is full of the cleaning liquid.

When the cleaning liquid is being stored in the tank 31 in the above-mentioned manner, the amount of the cleaning liquid being stored in the tank 31 is detected by having the control portion 100 provided with an electrical signal from the liquid amount detection sensor 38 that is installed inside the tank 31. In addition, same as the second embodiment, when washing is performed, using water type of cleaning liquid in which a surface acting agent is mixed, the surface acting agent is blended for the cleaning liquid being stored in the tank 31. Then, when the control portion 100 determines by an electrical signal from the liquid amount detection sensor 38 that the amount of the cleaning liquid being stored in the tank 31 is sufficient enough for the cleaning liquid to circulate, a control signal is given to the control valves 68 and 69, so as to make the control valves 68 and 69 open, respectively. Subsequently, after the control valve 62 is opened by having a control signal given to the control valve 62 by the control portion 100, a control signal is supplied to the pump 32, so as to drive the pump 32.

As described above, same as the second embodiment, after circulation of the cleaning liquid for the casing 1 by driving of the pump 32 is started, the control portion 100 gives a control signal to the control valve 63, so as to close the control valve 63, and thereby supply of the cleaning liquid from the liquid supply pipe 61 is stopped. Then, same as the second embodiment, in order to maintain the condition that the casing 1 is full of the cleaning liquid, the opening of the control valves 62 and 68 is adjusted. At this time, in order to maintain the amount of the cleaning liquid inside the tank 31 to be at the predetermined amount, the control portion 100 may adjust the opening of the control valve 69 based on an electrical signal from the liquid amount detection sensor 38.

In addition, when the casing 1 is full of the cleaning liquid, the control valve 68 may be opened, and the cleaning liquid may be supplied to the tank 31 by the liquid discharge pipe 41 and the air inlet and outlet pipe 52. At this time, the control portion 100 adjusts the opening of each of the control valves 63 and 68, and thereby it is prevented that the flow amount of the cleaning liquid being supplied from the liquid supply pipe 61 becomes less than the flow amount of the cleaning liquid being discharged from the liquid discharge pipe 41 and the air inlet and outlet pipe 52.

2. Washing Process

When circulation of the cleaning liquid is started as described above, same as a second embodiment, rotation of the washing tub 2 is started, and a washing article being contained in the washing tub 2 is washed. For the casing 1 that is provided with a rotating washing tub 2 therein, the cleaning liquid being pumped up from the tank 31 by the pump 32 is supplied from the pump discharge side pipe 34, and at the same time, the cleaning liquid finishing washing is discharged from the liquid discharge pipe 41 and the air inlet and outlet pipe 52. The cleaning liquid being discharged from the casing 1 by way of the liquid discharge pipe 41 and the air inlet and outlet pipe 52 is sent to the tank 31. Then, the cleaning liquid in the tank 31 is supplied to the waste liquid treatment portion 66 by way of the liquid discharge pipe 64, and after regeneration treatment is supplied to the cleaning liquid, the cleaning liquid is sent to the pump 32 by way of the pump suction side pipe 33.

Consequently, same as the washing apparatus in accordance with the second embodiment, in the washing apparatus in accordance with the present embodiment, the cleaning liquid can be circulated for the casing 1 by driving the pump 32, opening the control valves 62, 68 and 69, and closing the control valves 46, 63 and 67. Then, when the control portion 100 recognizes the relation between the supply amount of the cleaning liquid to the casing 1 and the discharge amount of the cleaning liquid from the casing 1 based on an electrical signal from the liquid amount detection sensor 38, same as the second embodiment, the flow amount of the cleaning liquid to be circulated can be controlled by adjusting the flow amount of the pump 32 or the opening of the control valves 62, 68 and 69. As a result, it is possible to maintain the condition that the casing 1 is full of the cleaning liquid, based on the amount of the cleaning liquid inside the tank 31.

In addition, same as the second embodiment, the tank 31 may be provided with a sensor that can detect the condition of the cleaning liquid, so as to make it possible to detect the contamination of the cleaning liquid. In other words, when the contamination of the cleaning liquid inside the tank 31 is worsened, the control valves 63 and 46 may be opened for the same amount temporarily so as to add the cleaning liquid from the outside. Moreover, when the cleaning liquid is added from the outside of the circulation path by opening the control valve 63, the control valve 67 may be opened in place of the control valve 46, so that the contaminated cleaning liquid in the circulation path may be discharged by way of the tank 31 and the drain pipe 65.

3. Discharge of the Cleaning Liquid

Subsequently, when the control portion 100 detects the completion of the washing process being performed by circulation of the cleaning liquid and rotation of the washing tub 2, same as the second embodiment, driving of the pump 32 is stopped, and the control valves 46 and 67 are opened, so as to start discharge of the cleaning liquid filling the casing 1. Thereby, same as the washing apparatus in accordance with the second embodiment, in the washing apparatus in accordance with the present embodiment, not only the cleaning liquid inside the casing 1 but also the cleaning liquid inside the tank 31 is discharged to the waste liquid treatment portion 44.

When the cleaning liquid is discharged from the casing 1 and the tank 31 in the above-mentioned manner, because the tank 31 is opened to the atmosphere, the air flows into the tank 31 from the outside air. Then, the air flowing from the outside air into the tank 31 flows into the casing 1 by way of the air inlet and outlet pipe 52. Consequently, because each of the casing 1 and the tank 31 is opened to the atmosphere, each of the casing 1 and the tank 31 is filled with the air instead of the cleaning liquid, and discharge of the cleaning liquid from the casing 1 and the tank 31, respectively, is promoted.

As described hereinabove, different from the second embodiment, the washing apparatus in accordance with the present invention is provided with the air inlet and outlet pipe 52 that connects the casing 1 to the tank 31, as an air flow path. As a result, because the casing 1 can be opened to the atmosphere by way of the tank 31 being opened to the atmosphere and the air inlet and outlet pipe 52, a time to supply the cleaning liquid to the casing 1 and a time to discharge the cleaning liquid from the casing 1 can be reduced. In addition, after all the air is discharged from the casing 1, the air inlet and outlet pipe 52 performs a same function as the liquid discharge pipe 41. As a result, it reduces a burden to be applied to the liquid discharge pipe 41 in circulation of the cleaning liquid by diversifying the burden to the air inlet and outlet pipe 52.

Moreover, in the present embodiment, when the casing 1 is full of the cleaning liquid, the air inside the casing 1 may be discharged to the tank 31 from the liquid discharge pipe 41, by opening the control valve 68. In other words, the liquid discharge pipe 41 performs a same function as the air inlet and outlet pipe 52, and also can control the amount of discharge of the cleaning liquid from the casing 1 by controlling the opening of the control valve 68 when the cleaning liquid is made to circulate. In addition, in the present embodiment, only the liquid discharge pipe 41 may be provided, with the control valve 68 and the air inlet and outlet pipe 52 removed, so that the liquid discharge pipe 41 may perform the above-mentioned function of the air inlet and outlet pipe 52.

Additionally, in the second and the third embodiments, for a circulation path of the cleaning liquid for the casing 1, the control valves 62, 68 and 69 are provided, so that the amount of supply of the cleaning liquid to the casing 1 and the amount of discharge of the cleaning liquid from the casing 1 are controlled. However, the control of the flow amount of the cleaning liquid to be circulated for the casing 1 is not limited by the aforementioned construction. The control valves 62, 68 and 69 may be removed from the piping arrangement, and the flow amount of the cleaning liquid to be circulated may be controlled, based on the flow amount of each pipe and on the capability of the pump 32.

In other words, in the second embodiment, in order that the flow amount of the cleaning liquid flowing through the liquid discharge pipe 41 is approximately equivalent to or slightly less than the flow amount of the cleaning liquid flowing through the pump discharge side pipe 34, piping area and piping resistance of the liquid discharge pipe 41 and the pump discharge side pipe 34 may be set. In addition, the amount of supply of the cleaning liquid to the casing 1 and the amount of discharge of the cleaning liquid from the casing 1 may be controlled by controlling the flow amount by the pump 32, and thereby the cleaning liquid may be circulated in a condition that the casing 1 is full of the cleaning liquid.

Industrial Applicability

The present invention can be applied to a washing apparatus which washes a washing article by rotating a washing tub inside a casing that is full of a cleaning liquid. In addition, the cleaning liquid to be used for the washing apparatus can be either water type of cleaning liquid or non-water type of cleaning liquid.

The invention claimed is:

1. A washing apparatus comprising:
   a drive mechanism;
   a washing tub configured to contain a washing article for washing, and being configured to be rotated by the drive mechanism around a rotating axis;
   a casing covering the washing tub;
   a liquid supply flow path configured to supply a cleaning liquid to the casing to fill the casing with the cleaning liquid for washing the washing article;
   a liquid discharge flow path configured to discharge the cleaning liquid from the casing;
   an air flow path enabling the casing to be in communication with an area outside of the casing;
   a detection portion configured to detect that the casing is filled with the cleaning liquid by air flow being blocked when the cleaning liquid flows into the air flow path;
   a pump configured to pump the cleaning liquid from the liquid discharge flow path to the liquid supply flow path; and
   a control portion configured to control supply, discharge and circulation of the cleaning liquid,
   the liquid supply flow path configured to supply the cleaning liquid to the casing, when the washing tub contains the washing article and the casing is in communication with the area outside of the casing after the washing article is put into the washing tub, and when the control portion detects a detection signal from the detection portion that the casing is filled with the cleaning liquid, the cleaning liquid is circulated from the liquid discharge flow path to the liquid supply flow path and thereafter to the casing, and the washing tub is rotated.

2. The washing apparatus as described in claim 1, wherein the washing tub includes an inner surface with concaves and convexes which line in a radial direction of the washing tub,
   the concaves and convexes are made of continuous curves, and
   the concaves and convexes extend in a direction parallel to the rotation.

3. The washing apparatus as described in claim 2, wherein the washing tub includes slits on the inner surface, which are open through an outer surface of the washing tub.

4. The washing apparatus as described in claim 1, wherein the air flow path includes an air valve configured to enable air to enter the casing and to be discharged the air from the casing, and to prohibit discharge of the cleaning liquid from the casing, and the detection portion determines that the casing is filled with the cleaning liquid, when the cleaning liquid enters the air flow path and blocks the air flow, closing the air valve.

5. The washing apparatus as described in claim 4, further comprising
   a tank configured to store the cleaning liquid,
   the pump being connected the tank.

6. The washing apparatus as described in claim 5, wherein the pump is configured to supply the cleaning liquid to the casing through the liquid supply flow path from the tank until the casing is filled with the cleaning liquid, and after the casing is determined to be filled with the cleaning liquid, the pump is configured to circulate the cleaning liquid from the liquid discharge flow path to the liquid supply flow path.

7. The washing apparatus as described in claim 5, wherein the liquid discharge flow path and the tank are connected,
   the pump is configured to directly supply the cleaning liquid to the casing from the liquid supply flow path by stopping until the casing is filled with the cleaning liquid, and
   the pump is configured to circulate the cleaning liquid, after detecting that the casing is filled with the cleaning liquid, by pumping the cleaning liquid to the liquid supply flow path from the tank after the cleaning liquid is discharged to the tank.

8. The washing apparatus as described in claim 1, further comprising
   a tank configured to store the cleaning liquid, the tank being connected to the liquid discharge flow path, the air flow path, and the pump; and
   a liquid amount detection sensor configured to measure the cleaning liquid in the tank,
   the air flow path being configured to discharge air inside the casing to the tank, and to discharge the cleaning liquid inside the casing to the tank, when the casing is filled with the cleaning liquid, and
   the detection portion being configured to determine that the casing is filled with the cleaning liquid, when an amount of the cleaning liquid in the tank is equal to or more than a predetermined amount.

* * * * *